(12) United States Patent
Nomura et al.

(10) Patent No.: US 8,799,246 B2
(45) Date of Patent: Aug. 5, 2014

(54) APPARATUS AND METHOD OF PRODUCING MAP DIFFERENTIAL DATA

(75) Inventors: Toshio Nomura, Chiryu (JP); Takamitsu Suzuki, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/546,244

(22) Filed: Jul. 11, 2012

(65) Prior Publication Data

US 2013/0031132 A1 Jan. 31, 2013

(30) Foreign Application Priority Data

Jul. 27, 2011 (JP) ................................. 2011-164368

(51) Int. Cl.
*G06F 17/00* (2006.01)
*G06F 17/30* (2006.01)
*G01C 21/32* (2006.01)

(52) U.S. Cl.
CPC ...................................... *G01C 21/32* (2013.01)
USPC ......................................... 707/695; 707/737

(58) Field of Classification Search
USPC .................. 707/625, 695, 770, 806, 736, 737
See application file for complete search history.

(56) References Cited

U.S. PATENT DOCUMENTS

| | | | | |
|---|---|---|---|---|
| 8,249,801 B2* | 8/2012 | Sakai et al. | ................... | 701/408 |
| 8,386,172 B2* | 2/2013 | Sakakibara | ................... | 701/450 |
| 2004/0135705 A1* | 7/2004 | Umezu et al. | ............ | 340/995.14 |
| 2006/0190507 A1* | 8/2006 | Sekine et al. | ................. | 707/205 |
| 2009/0171976 A1 | 7/2009 | Obara et al. | | |
| 2009/0177706 A1* | 7/2009 | Takahata et al. | ............... | 707/200 |
| 2010/0023554 A1 | 1/2010 | Fujimoto et al. | | |
| 2010/0030460 A1 | 2/2010 | Sawai et al. | | |
| 2010/0274469 A1* | 10/2010 | Takahata et al. | ............... | 701/200 |
| 2011/0137546 A1* | 6/2011 | Roesser et al. | ................. | 701/200 |
| 2011/0179080 A1* | 7/2011 | Miyazaki et al. | ............. | 707/772 |
| 2011/0191285 A1* | 8/2011 | Sawai | ........................... | 707/602 |

FOREIGN PATENT DOCUMENTS

JP 2006-317643 11/2006

OTHER PUBLICATIONS

Office Action mailed Jul. 23, 2013 in the corresponding JP application No. 2011-164368 with English translation thereof.
Office Action mailed Mar. 11, 2014 in the corresponding JP Application No. 2011-164368 with English translation.

* cited by examiner

*Primary Examiner* — Md. I Uddin
(74) *Attorney, Agent, or Firm* — Harness, Dickey & Pierce, PLC

(57) ABSTRACT

An apparatus includes a map data storage device, a map update device, a determination device, and a data production device. The storage device stores map data. The update device reflects a first map update to a first version of the map data to produce a second version of the map data when the first map update occurs. The update device reflects a second map update to the second version of the map data to produce a third version of the map data when the second map update occurs after the first map update. The determination device determines whether the first and second map updates depend on each other. The production device produces map differential data from the first and second map updates when the determination device determines that the first and second map updates depend on each other.

15 Claims, 6 Drawing Sheets

1st VER.

2nd VER.

3rd VER.

4th VER.

1st VER.

3rd VER.

1st VER.

3rd VER.

APPARATUS AND METHOD OF PRODUCING MAP DIFFERENTIAL DATA

CROSS REFERENCE TO RELATED APPLICATION

This application is based on Japanese Patent Application No. 2011-164368 filed on Jul. 27, 2011, the disclosure of which is incorporated herein by reference.

TECHNICAL FIELD

The present disclosure relates to an apparatus and method of producing map differential data upon occurrence of a map update for updating a map element of map data that represents arrangement of map elements.

BACKGROUND

US 2010/0030460A1 corresponding to JP 2008-249798A discloses a data distribution apparatus for distributing map differential data to a vehicle navigation apparatus when a map update for updating (e.g., adding or deleting) a map element (e.g., roads) of map data occurs. The map differential data is a difference between pre-update map data and post-update map data.

In the conventional data distribution apparatus, the map differential data is produced in units of blocks in a map and stacked in chronological order. Assuming that the map differential data is managed by versions, not only map differential data for the latest version of map data but also map differential data for the immediately previous version of map data are required to update the map data to the latest version. Accordingly, the volume of the map differential data distributed to the vehicle navigation apparatus is increased so that communication cost and time necessary to update the map data can be increased. Further, when a road is located over adjacent blocks, both of the blocks need to be updated. If only one block is updated without updating the other block, a road network is not ensured. That is, the road is disconnected in a map displayed on the vehicle navigation apparatus.

SUMMARY

In view of the above, it is an object of the present disclosure to provide an apparatus and method of producing map differential data for ensuring a road network and for reducing the volume of the map differential data distributed to a vehicle.

According to an aspect of the present disclosure, an apparatus includes a map data storage device, a map update device, a determination device, and a data production device. The map data storage device stores map data representing arrangement of map elements. The map update device reflects a first map update of a first map element to a first version of the map data to produce a second version of the map data when the first map update occurs. The map update device reflects a second map update of a second map element to the second version of the map data to produce a third version of the map data when the second map update occurs after the first map update. The determination device determines whether the first map update and the second map update depend on each other by determining whether the first map element and the second map element have a common portion. The data production device produces map differential data from the first map update and the second map update when the determination device determines that the first map update and the second map update depend on each other.

According to another aspect of the present disclosure, a method includes a step of reflecting a first map update of a first map element to a first version of map data representing arrangement of map elements to produce a second version of the map data when the first map update occurs, a step of reflecting a second map update of a second map element to the second version of the map data to produce a third version of the map data when the second map update occurs after the first map update, a step of determining whether the first map update and the second map update depend on each other by determining whether the first map element and the second map element have a common portion, and a step of producing map differential data from the first map update and the second map update upon determination that the first map update and the second map update depend on each other.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiment

Figure 1:
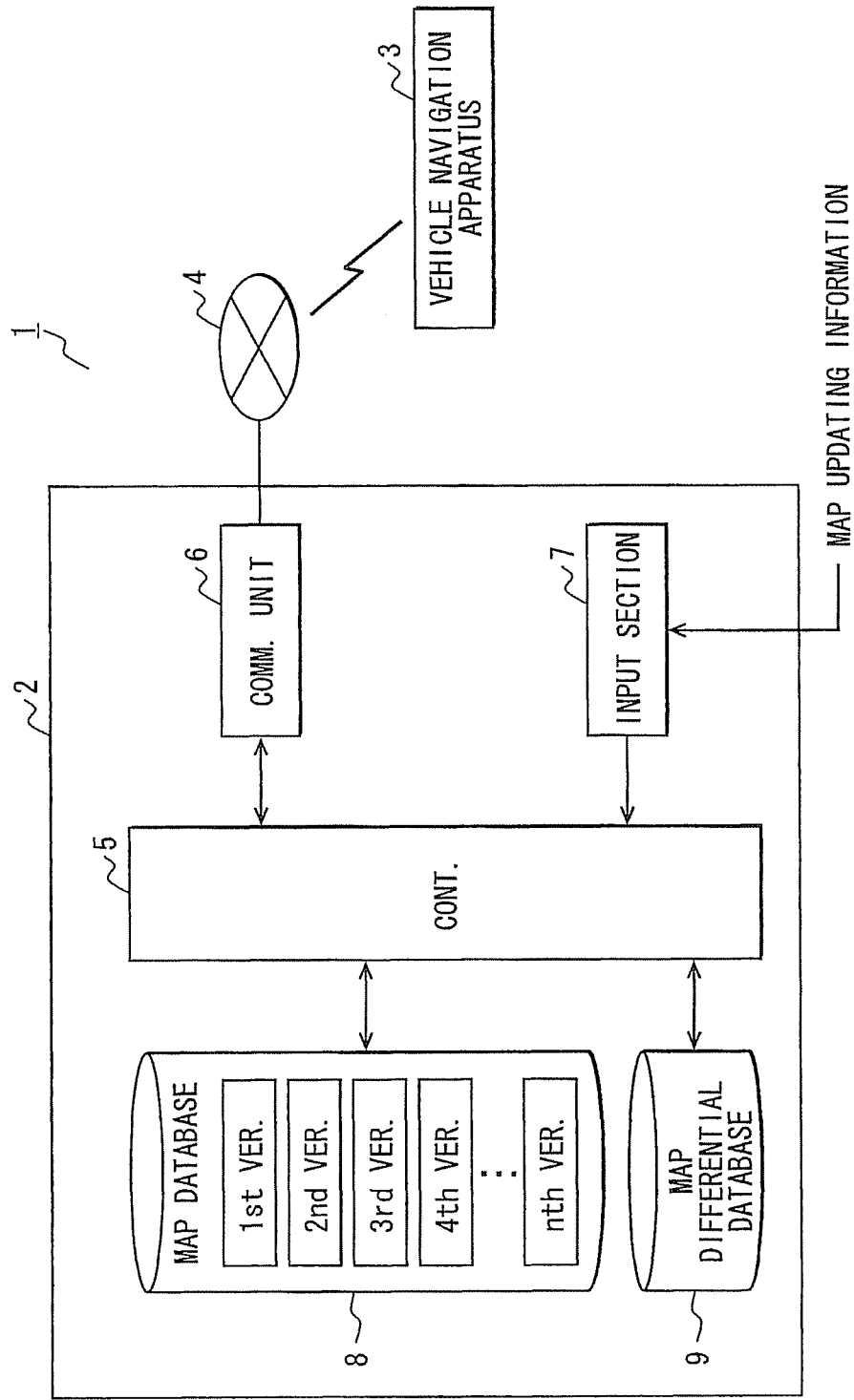
FIG. 1 is a block diagram of a map differential data distribution system according to an embodiment of the present disclosure.

A map differential data distribution system 1 according to an embodiment of the present disclosure is described below with reference to FIG. 1. The distribution system 1 includes a map differential data distribution apparatus 2 and a vehicle navigation apparatus 3 (i.e., an apparatus mounted on a vehicle in claims). The distribution apparatus 2 distributes map differential data to the navigation apparatus 3. The navigation apparatus 3 receives the map data distributed from the distribution apparatus 2. The distribution apparatus 2 and the navigation apparatus 3 can communicate with each other over a communication network 4. The communication network 4 can include a fixed communication network and a mobile communication network.

The distribution apparatus 2 includes a controller 5 (i.e., a map update device, a determination device, and a data production device in claims), a communication unit 6 (i.e., a distribution device in claims), a map updating information input section 7, a map database 8, and a map differential database 9.

The controller 5 can be configured as a typical microcomputer with a CPU, a RAM, a ROM, an input/output bus, and the like. The controller 5 controls operations of the distribution apparatus 2 such as a data management operation and a communication operation. The communication unit 6 controls a wide area communication operation with the communication network 4. The input section 7 receives map updating information from outside of the distribution apparatus 2. The map updating information causes a map update for updating a map element of map data (e.g., for adding or deleting a map element to or from the map data). The map element is a road, an intersection, or the like, which serves as a unit of a map. According to the embodiment, the map element is a road. For example, when a new road is opened up, map updating information causing a map update for adding a map element to the map data is inputted to the input section 7. For another example, when an existing road is closed, map updating information causing a map update for deleting a map element from the map data is inputted to the input section 7. For example, an operator can input such map updating information into the input section 7 by using an input device such as a keyboard or a mouse.

The map database 8 stores map data representing arrangement of map elements. For example, when the map update information causing the map update for adding a map element to the map data is inputted to the input section 7, the controller 5 reflects the addition of the map element to the latest version of the map data stored in the map database 8 to produce a new version of the map data. Likewise, when the map update information causing the map update for deleting a map element from the map data is inputted to the input section 7, the controller 5 reflects the deletion of the map element to the latest version of the map data stored in the map database 8 to produce a new version of the map data. Further, the controller 5 causes the map database 8 to store the new version of the map data as the current latest version of the map data by assigning a new version number to the new version of the map data. According to the embodiment, the latest version of the map data is map data with the largest version number.

The navigation apparatus 3 performs various functions including a position detection function of detecting a current position of the vehicle, a data read function of reading map data from a storage medium, a map draw function of drawing a map based on the read map data, a destination setting function of setting a destination, a route search function of searching for a route from the current position to the destination, a route draw function of drawing the searched route on the map, and a guidance function of providing a route guidance to guide the vehicle along the searched route. When the navigation apparatus 3 receives map differential data from the distribution apparatus 2, the navigation apparatus 3 updates the map data stored in the storage medium by using the map differential data. The map difference data accommodates update of map data such as addition, deletion, and modification of map elements. After the map data stored in the storage medium is updated by using the map differential data, the navigation apparatus 3 performs the functions based on the updated map data.

Figure 2:
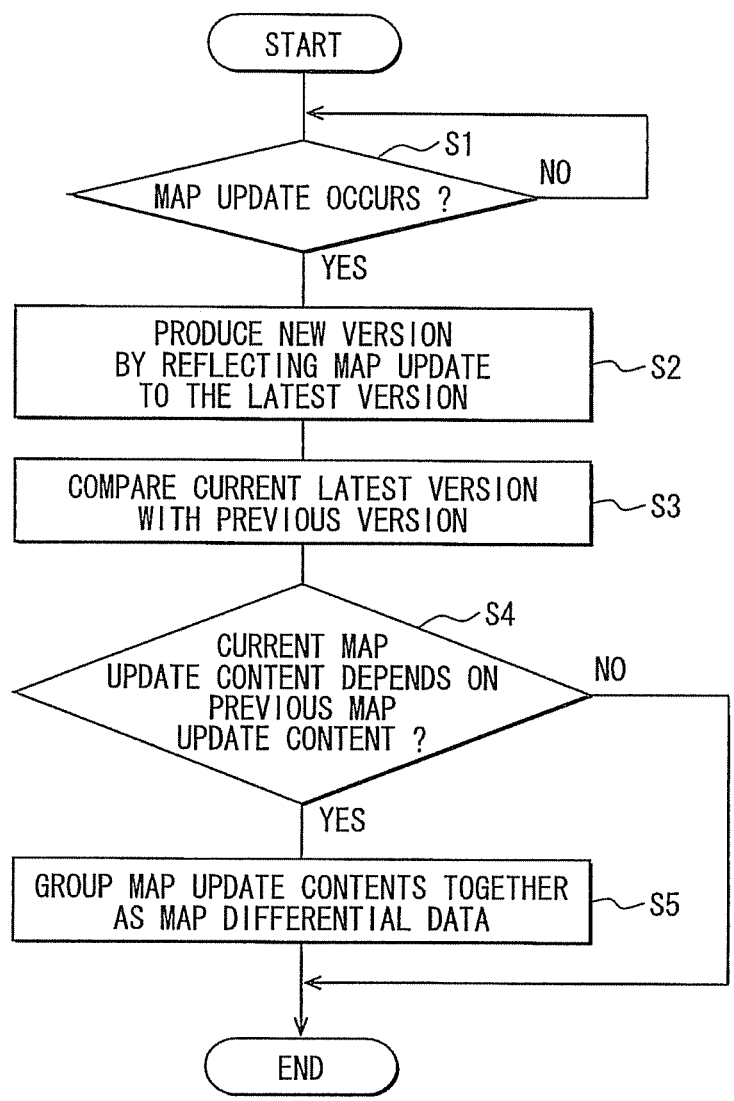
FIG. 2 is a flow diagram of a control process performed by a controller of the distribution system of FIG. 1.

FIG. 2 is a flow chart of a control process performed by the controller 5 of the distribution apparatus 2.

The control process starts at S1, where the controller 5 determines whether the map update occurs by determining whether the map updating information is inputted into the input section 7. If the map update occurs corresponding to YES at S1, the control process proceeds to S2, where the controller 5 produces a new version of map data by reflecting a content of the map update to the latest version of the map data stored in the map database 8.

Then, the control process proceeds to S3, where the controller 5 compares the current latest version (i.e., the new version produced at S2) of the map data with the previous version of the map data. Then, the control process proceeds to S4, where the controller 5 determines whether the content of the current map update used to produce the current latest version depends on a content of a previous map update used to produce the previous version. Specifically, at S4, the controller 5 determines whether the content of the current map update and the content of the previous map update have a common portion. If the content of the current map update depends on the content of the previous map update corresponding to YES at S4, the control process proceeds to S5, where the controller 5 groups the contents of the current map update and the previous map update together to produce map differential data. After S5, the control process is ended. In contrast, if the content of the current map update does not depend on the content of the previous map update corresponding to NO at S4, the control process is ended by skipping S5.

A concrete example of the control process performed by the controller 5 is described below with reference to FIGS. 3A-3D and FIG. 4.

Figure 3A:
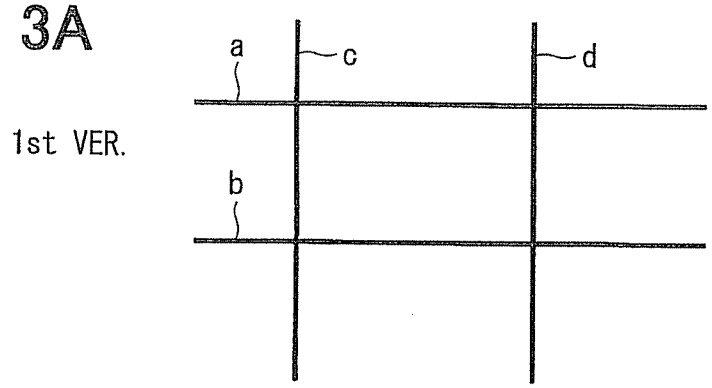
FIGS. 3A, 3B, 3C, and 3D are diagrams illustrating a manner in which map data is updated from the first version to the fourth version by the control process of FIG. 2.
Figure 3B:
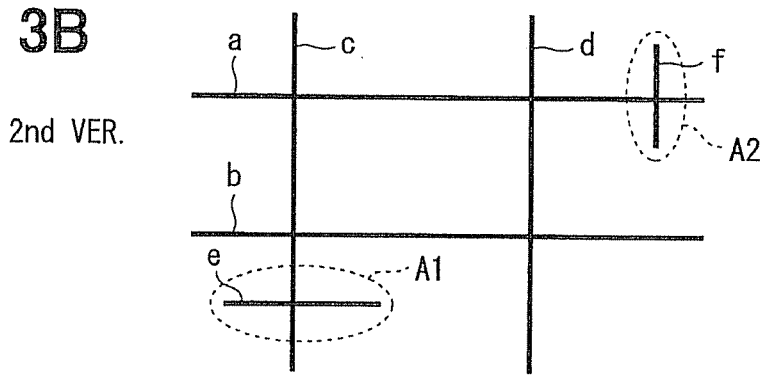

FIG. 3A shows the first version of map data stored in the map database 8. As shown in FIG. 3A, roads "a", "b", "c", and "d" are arranged in the first version of the map data. Then, when a map update, for adding a new road "e" crossing the road "c" and a new road "f" crossing the road "a", occurs according to the opening up of the new roads "e" and "f", the controller 5 produces the second version of the map data shown in FIG. 3B by reflecting the addition of the new roads "e" and "f" to the first version of the map data. The roads "e" and "f" correspond to a first map element or a first road in claims. In FIG. 3B, A1 represents a content of the map update corresponding to the addition of the road "e", and A2 represents a content of the map update corresponding to the addition of the road "f".

Figure 3C:
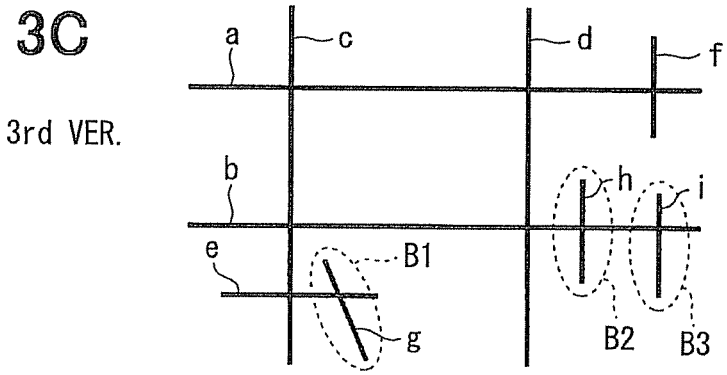

Then, when a map update, for adding a new road "g" crossing the road "e", a new road "h" crossing the road "b", and a new road "i" crossing the road "b", occurs according to the opening up of the new roads "g", "h", and "i", the controller 5 produces the third version of the map data shown in FIG. 3C by reflecting the addition of the new roads "g", "h", and "i" to the second version of the map data. The roads "g", "h", and "i" correspond to a second map element or a second road in claims. In FIG. 3C, B1 represents a content of the map update corresponding to the addition of the road "g", B2 represents a content of the map update corresponding to the addition of the road "h", and B3 represents a content of the map update corresponding to the addition of the road "i".

After the third version of the map data is produced as described above, the controller 5 compares the third version (i.e., current latest version) of the map data with the second version (i.e., previous version) of the map data. Then, the controller 5 determines whether the content of the current map update (i.e., the addition of the roads "g", "h", and "i") reflected to the third version of the map data depends on the content of the previous map update (i.e., the addition of the roads "e" and "f") reflected to the second version of the map data.

In this example, as shown in FIGS. 3B and 3C, the road "g", which is included in the content of the current map update reflected to the third version of the map data, crosses the road "e", which is included in the content of the previous map update reflected to the second version of the map data. That is, the content of the current map update and the content of the previous map update have a common portion. Therefore, the controller 5 determines that the addition of the road "g" depends on the addition of the road "e" and relates the addition of the road "g" (i.e., the content B1) to the addition of the road "e" (i.e., the content A1) as indicated by an arrow LN1 in FIG. 4.

In contrast, each of the roads "h" and "i", which are included in the content of the current map update reflected to the third version of the map data, does not cross any one of the roads "e" and "f", which are included in the content of the previous map update reflected to the second version of the map data. Therefore, the controller 5 determines that the addition of the roads "h" and "i" does not depend on any content of the previous map update.

Then, the controller 5 groups the addition of the road "g" and the addition of the road "e" (i.e., related contents of the current map update and the previous map update) together to produce map differential data and stores the map differential data in the map differential database 9.

Then, for example, when a user inputs a command into the navigation apparatus 3 to request map differential data, a request signal for requesting the map differential data is transmitted from the navigation apparatus 3 to the distribution apparatus 2 over the communication network 4. Upon receipt of the request signal through the communication unit 6, the controller 5 reads the map differential data, indicating both the addition of the road "g" and the addition of the road "e", from the map differential database 9 and transmits the read map differential data to the navigation apparatus 3 through the communication unit 6. The navigation apparatus 3 updates the map data stored in the storage medium by using the received map differential data. Since the map differential data is produced by relating the addition of the road "g" to the addition of the road "e", the map data of the navigation apparatus 3 can be updated by using the map differential data so that the road "g" can surely connect to another road (e.g., road "c") through the road "e". Thus, a road network in the updated map data of the navigation apparatus 3 can be ensured.

Figure 5A:
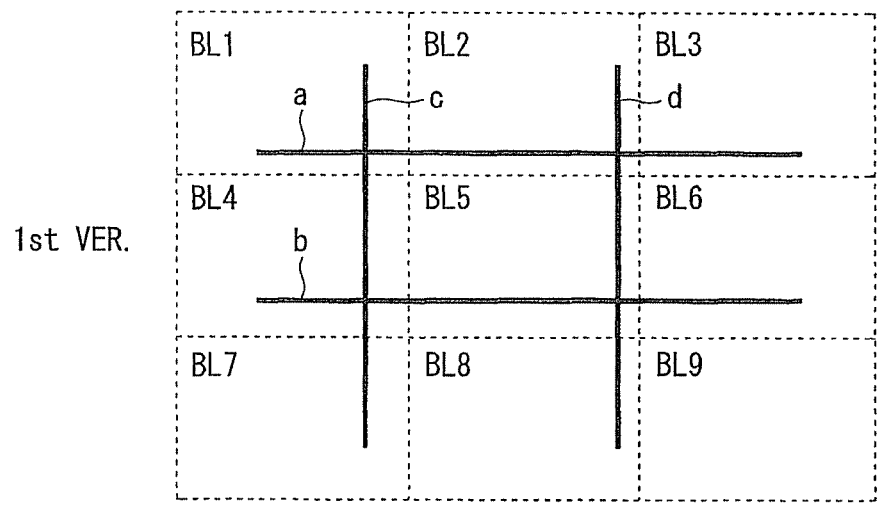
FIGS. 5A and 5B are diagrams illustrating a manner in which the map data is updated from the first version to the third version by a control process according to a related art.
Figure 5B:
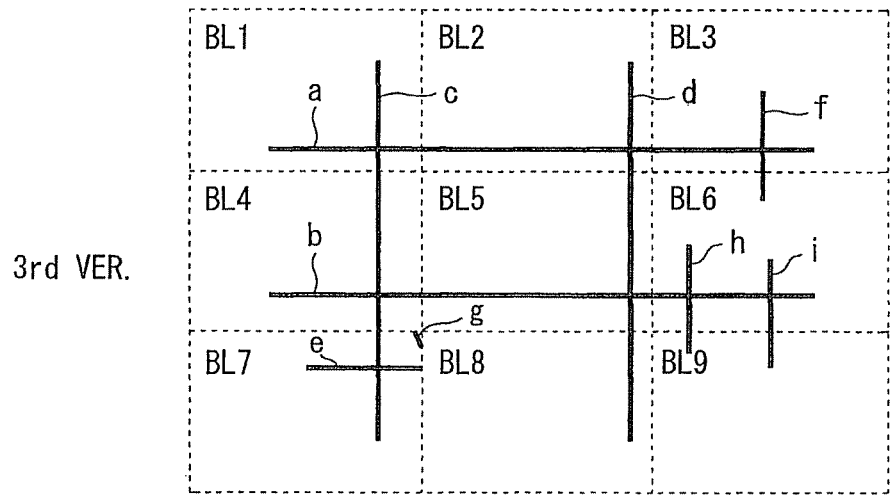
Figure 6A:
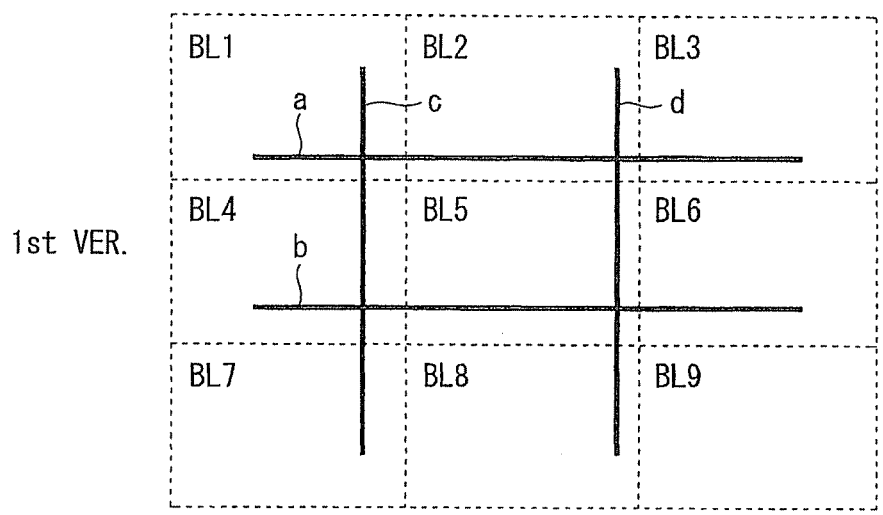
FIGS. 6A and 6B are diagrams illustrating a manner in which the map data is updated from the first version to the third version by the control process of FIG. 2.
Figure 6B:
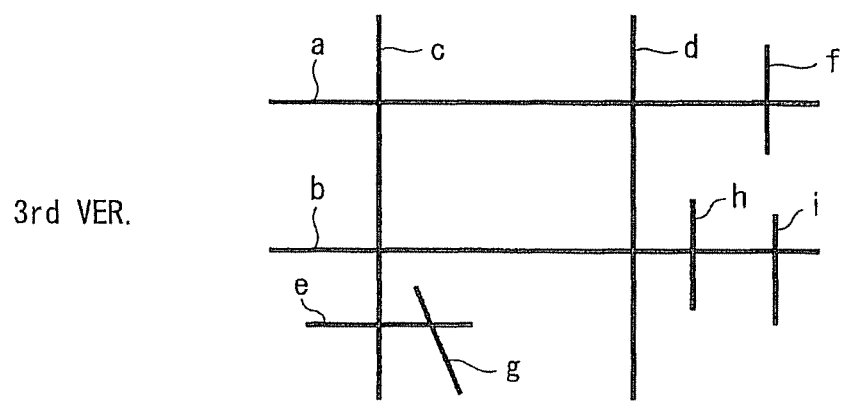

Another advantage of producing the map difference data in units of map elements rather than blocks is as follows. FIGS. 5A and 5B are diagrams illustrating a manner in which the map data is updated from the first version to the third version by map differential data produced in units of blocks BL1-BL9. In the case of FIGS. 5A and 5B, if the block BL7 is updated to produce the third version without updating the block BL8, the roads "e" and "g" have incomplete shapes unlike actual road shapes. FIGS. 6A and 6B are diagrams illustrating a manner in which the map data is updated from the first version to the third version by map differential data produced in units of map elements. In the case of FIGS. 6A and 6B, the roads "e" and "g" have complete shapes like actual road shapes.

Figure 3D:
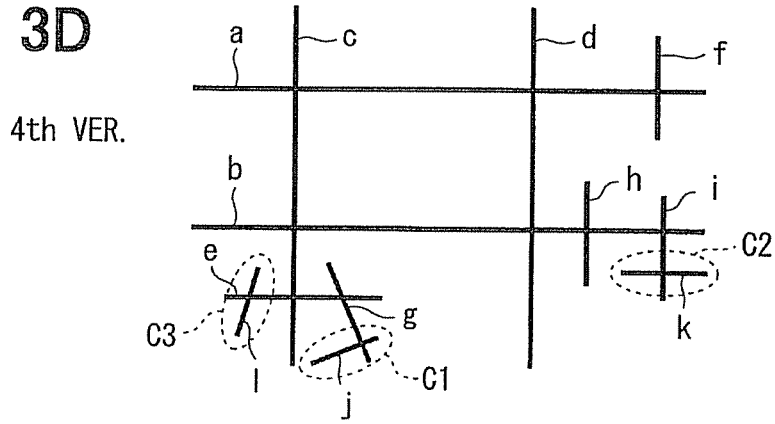
Figure 4:
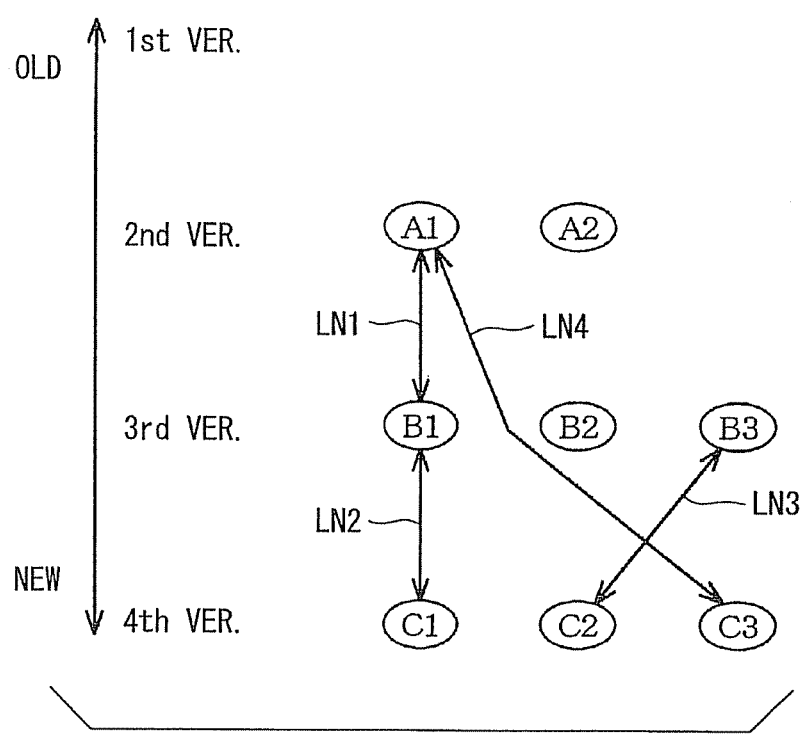
FIG. 4 is a diagram illustrating dependency between map elements of the map data.

Then, when a map update, for adding a new road "j" crossing the road "g", a new road "k" crossing the road "i", and a new road "l" crossing the road "e", occurs according to the opening up of the new roads "j", "k", and "l", the controller 5 produces the fourth version of map data shown in FIG. 3D by reflecting the addition of the new roads "j", "k", and "l" to the third version of map data. The roads "j", "k", and "l" correspond to a third map element or a third road. In FIG. 3D, C1 represents a content of the map update corresponding to the addition of the road "j", C2 represents a content of the map update corresponding to the addition of the road "k", and C3 represents a content of the map update corresponding to the addition of the road "l".

After the fourth version of map data is produced as described above, the controller 5 compares the fourth version (i.e., current latest version) of map data with each of the second version and the third version (i.e., previous version) of map data. Then, the controller 5 determines whether the content of the current map update (i.e., the addition of the roads "j", "k", and "l") reflected to the fourth version of map data depends on the content of the previous map update (i.e., the addition of the roads "e" and "f" and the addition of roads "g", "h", and "i") reflected to the second version of map data and the third version of map data.

In this example, as shown in FIGS. 3B, 3C, and 3B, the road "j", which is included in the content of the current map update reflected to the fourth version of map data, crosses the road "g", which is included in the content of the previous map update reflected to the third version of map data. Therefore, the controller 5 determines that the addition of the road "j" depends on the addition of the road "g" and relates the addition of the road "j" (i.e., the content C1) to the addition of the road "g" (i.e., the content B1) as indicated by an arrow LN2 in FIG. 4.

Further, the road "k", which is included in the content of the current map update reflected to the fourth version of map data, crosses the road "i", which is included in the content of the previous map update reflected to the third version of map data. Therefore, the controller 5 determines that the addition of the road "k" depends on the addition of the road "i" and relates the addition of the road "k" (i.e., the content C2) to the addition of the road "i" (i.e., the content B3) as indicated by an arrow LN3 in FIG. 4.

Furthermore, the road "l", which is included in the content of the current map update reflected to the fourth version of map data, crosses the road "e", which is included in the content of the previous map update reflected to the second version of map data. Therefore, the controller 5 determines that the addition of the road "l" depends on the addition of the road "e" and relates the addition of the road "l" (i.e., the content C3) to the addition of the road "e" (i.e., the content A1) as indicated by an arrow LN4 in FIG. 4.

Then, the controller 5 groups the addition of the road "j", the addition of the road "g", the addition of the road "k", the addition of the road "i", the addition of the road "l", and the addition of the road "e" (i.e., the related contents of the current map update and the previous map update) together to produce map differential data and stores the map differential data in the map differential database 9.

Then, for example, when a user inputs a command into the navigation apparatus 3 to request map differential data, a request signal for requesting the map differential data is transmitted from the navigation apparatus 3 to the distribution apparatus 2 over the communication network 4. Upon receipt of the request signal through the communication unit 6, the controller 5 reads the map differential data, indicating the addition of the road "j", the addition of the road "g", the addition of the road "k", the addition of the road "i", the addition of the road "l", and the addition of the road "e", from the map differential database 9 and transmits the read map differential data to the navigation apparatus 3 through the communication unit 6. The navigation apparatus 3 updates the map data stored in the storage medium by using the received map differential data. Since the map differential data is produced by relating the addition of the road "j" to the addition of the road "g", by relating the addition of the road "k" to the addition of the road "i", and by relating the addition of the road "l" to the addition of the road "e", the map data of the navigation apparatus 3 can be updated by using the map differential data so a road network in the updated map data of the navigation apparatus 3 can be ensured.

The above description is based on the assumption that the map update is for adding a road as a map element. The same holds true for when the map update is for deleting a road as a map element. Further, the same holds true for when the map data is updated to the fifth or any later version. Further, the same holds true for when a map element is an intersection or the like.

As described above, according to the embodiment, when the map update for adding the roads "e" and "f" to the first version of the map data occurs in the distribution apparatus 2, the addition of the roads "e" and "f" is reflected to the first version of map data so that the second version of the map data can be produced. Then, when the map update for adding the roads "g", "h", and "i" to the second version of the map data occurs in the distribution apparatus 2, the addition of the roads "g", "h", and "i" is reflected to the second version of the map data so that the third version of the map data can be produced. At this time, it is determined whether each of the additions of the roads "g", "h", and "i" depends on any of the additions of the roads "e" and "f". Then, the addition of the road "g" and the addition of the road "e" are grouped together into map differential data due to their dependence on each other.

Thus, the map differential data is produced in units of map elements rather than blocks so that the volume of the map differential data distributed to the navigation apparatus 3 over the communication network 4 can be reduced. Further, since the addition of the road "g" and the addition of the road "e" are grouped together into the map differential data due to their dependence on each other, the road "g" can connect to the road "c" through the road "e" so that a road network in the updated map data of the navigation apparatus 3 can be ensured.

(Modifications)

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

In the embodiment, the distribution apparatus 2 distributes the map differential data to the navigation apparatus 3 when a user inputs a command to the navigation apparatus 3 to request the map differential data. The time when the distribution apparatus 2 distributes the map differential data to the navigation apparatus 3 is not limited to the embodiment. For example, the distribution apparatus 2 can automatically distribute the map differential data to the navigation apparatus 3 at a regular interval (e.g., every thirty days). For another example, a travel distance of a vehicle can be measured, and the distribution apparatus 2 can distribute the map differential data to the navigation apparatus 3 when the measured travel distance reaches a predetermined distance. In this case, the measured travel distance can be reset when the map differential data is distributed.

In the embodiment, the map differential data is produced by determining dependency between roads (i.e., a link and nodes at the end of the link) as map elements. Alternatively, the map differential data can be produced by determining dependency between information items associated with roads, such as guidance information or POI (Points of Interest) content. In other words, a map element can be an information item associated with a road, such as guidance information or POI (Points of Interest) content.

What is claimed is:
1. An apparatus comprising:
a map data storage device configured to store map data representing arrangement of map elements, the map data not being stored in units of blocks of a map;
a map update device configured to reflect a first map update of a first map element to a first version of the map data to produce a second version of the map data when the first map update occurs, the map update device configured to reflect a second map update of a second map element to the second version of the map data to produce a third version of the map data when the second map update occurs after the first map update;
a determination device configured to determine whether the first map update and the second map update depend on each other by determining whether there is a connection between the first map element and the second map element; and
a data production device configured to produce map differential data in units of map elements rather than blocks from the first map update and the second map update when the determination device determines that the first map update and the second map update depend on each other and distributed to a navigation apparatus in response to a user request, wherein
when there is the connection between the first map element and the second map element, the determination device determines that the first map update and the second map update depend on each other,
the first map element and the second map element are different from each other;
the first map element is a first road;
the second map element is a second road;
when the first road and the second road are directly connected to each other in the third version of the map data, the determination device determines that the first road and the second road depend on each other, and the first road and the second road are grouped together into the map differential data due to their dependencies on each other;
when the first road and the second road are not directly connected to each other in the third version of the map, the determination device determines that the first road and the second road do not depend from each other and the first road and the second road are not grouped together; and
the grouping together requires the apparatus to provide current latest version of map data with each of the second version and the third version of map data wherein a controller determines by comparing whether the content of current map update reflected to the current latest version of map data depends on the content of the previous map update reflected to the second version of map data and the third version of map data.

2. The apparatus according to claim 1, further comprising:
a distribution device configured to distribute the differential map data to an apparatus mounted on a vehicle.

3. The apparatus according to claim 1, wherein the connection between the first map element and the second map element is determined when the second map element relies on the first map element to ensure an interconnected road network.

4. The apparatus according to claim 1, wherein the connection between the first map element and the second map element is a physical connection.

5. The apparatus according to claim 1, wherein the map differential data is produced in units of map elements.

6. The apparatus according to claim 5, wherein the map elements are the first and second roads.

7. The apparatus according to claim 1, wherein the map elements are the first and second roads.

8. A method comprising:
reflecting a first map update of a first map element to a first version of map data representing arrangement of map elements to produce a second version of the map data when the first map update occurs, the map data not being in units of blocks of a map;
reflecting a second map update of a second map element to the second version of the map data to produce a third version of the map data when the second map update occurs after the first map update;
determining whether the first map update and the second map update depend on each other by determining whether there is a connection between the first map element and the second map element; and
producing map differential data in units of map elements rather than blocks from the first map update and the second map update upon determination that the first map update and the second map update depend on each other and distributed to a navigation apparatus in response to a user request, wherein
the determining step determines that the first map update and the second map update depend on each other, when there is the connection between the first map element and the second map element,
the first map element and the second map element are different from each other;
the first map element is a first road;
the second map element is a second road;
when the first road and the second road are directly connected to each other in the third version of the map data, the determination device determines that the first road and the second road depend on each other, and the first road and the second road are grouped together into the map differential data due to their dependencies on each other;
when the first road and the second road are not directly connected to each other in the third version of the map, the determination device determines that the first road and the second road do not depend from each other and the first road and the second road are not grouped together; and
the grouping together requires the apparatus to provide current latest version of map data with each of the second version and the third version of map data wherein a controller determines by comparing whether the content of current map update reflected to the current latest version of map data depends on the content of the previous map update reflected to the second version of map data and the third version of map data.

9. The apparatus according to claim 8, wherein the connection between the first map element and the second map element is determined when the second map element relies on the first map element to ensure an interconnected road network.

10. The apparatus according to claim 8, wherein the connection between the first map element and the second map element is a physical connection.

11. The apparatus according to claim 8, wherein the map differential data is produced in units of map elements.

12. An apparatus comprising:
a map data storage device storing map data representing arrangement of map elements, the map data not being stored in units of blocks of a map;
a map update device reflecting a first map update of a first map element to a first version of the map data to produce a second version of the map data when the first map update occurs, the map update device reflecting a second map update of a second map element to the second version of the map data to produce a third version of the map data when the second map update occurs after the first map update;
a determination device determining whether the first map update and the second map update depend on each other by determining whether there is a connection between the first map element and the second map element; and
a data production device producing map differential data in units of map elements rather than blocks from the first map update and the second map update by grouping together the first and second map elements when the determination device determines that the first map update and the second map update depend on each other due to the connection between the first map element and the second map element and distributed to a navigation apparatus in response to a user request; wherein
when the first road and the second road are not directly connected to each other in the third version of the map, the determination device determines that the first road and the second road do not depend from each other and the first road and the second road are not grouped together; and
the grouping together requires the apparatus to provide current latest version of map data with each of the second version and the third version of map data wherein a controller determines by comparing whether the content of current map update reflected to the current latest version of map data depends on the content of the previous map update reflected to the second version of map data and the third version of map data.

13. The apparatus according to claim 12, wherein:
when the first road and the second road are directly connected to each other in the third version of the map data, the determination device determines that the first road and the second road depend on each other, and the first road and the second road are grouped together into the map differential data due to their dependencies on each other.

14. The apparatus according to claim 1, wherein the connection between the first map element and the second map element is an intersection between the first road and the second road.

15. An apparatus comprising:
a map data storage device configured to store map data representing arrangement of map elements, the map data not being stored in units of blocks of a map;
a map update device configured to reflect a first map update of a first road to a first version of the map data to produce a second version of the map data when the first map update occurs, the map update device configured to reflect a second map update of a second road to the second version of the map data to produce a third version of the map data when the second map update occurs after the first map update;
a determination device configured to determine whether the first map update and the second map update depend on each other by determining whether there is an intersection between the first road and the second road; and
a data production device configured to produce map differential data in units of map elements rather than blocks from the first map update and the second map update when the determination device determines that the first map update and the second map update depend on each other and distributed to a navigation apparatus in response to a user request, wherein when there is the intersection between the first road and the second road, the determination device determines that the first map update and the second map update depend on each other, the first road and the second road are different from each other;

when the first road and the second road intersect in the third version of the map data, the determination device determines that the first road and the second road depend on each other, and the first road and the second road are grouped together into the map differential data due to their dependencies on each other;

when the first road and the second road do not intersect in the third version of the map, the determination device determines that the first road and the second road do not depend from each other and the first road and the second road are not grouped together; and the grouping together requires the apparatus to provide current latest version of map data with each of the second version and the third version of map data wherein a controller determines by comparing whether the content of current map update reflected to the current latest version of map data depends on the content of the previous map update reflected to the second version of map data and the third version of map data.

* * * * *